Dec. 7, 1965  L. B. PEARSON  3,221,707
AUTOMATIC LIVESTOCK HEAD GATE
Filed Sept. 28, 1964  2 Sheets-Sheet 1

INVENTOR.
Laurence B. Pearson
BY
Scofield, Kokjer, Scofield & Lowe
ATTORNEYS.

Dec. 7, 1965    L. B. PEARSON    3,221,707
AUTOMATIC LIVESTOCK HEAD GATE
Filed Sept. 28, 1964    2 Sheets-Sheet 2

INVENTOR.
Laurence B. Pearson
BY
Scofield, Kokjer, Scofield & Lowe
ATTORNEYS.

United States Patent Office 3,221,707
Patented Dec. 7, 1965

3,221,707
AUTOMATIC LIVESTOCK HEAD GATE
Laurence B. Pearson, Thedford, Nebr.
Filed Sept. 28, 1964, Ser. No. 399,516
9 Claims. (Cl. 119—98)

This invention relates generally to apparatus for use in the handling of livestock and deals more particularly with an improved head gate for temporarily engaging and holding same so that they can be examined and subjected to such operations as are necessary.

One of the primary objects of the invention is to provide an improved head gate structure of the type which is self operated in response to the advance of the animal into the head gate area and which has the advantage of being operable, from catch through release, by one man. A special feature of the invention in this respect is the provision of a head gate in which the animal itself provides the necessary force for locking itself in the gate structure and yet in which the animal can be released to move in either direction relative to the gate structure, that is on through the gate or back in the direction from whence it came, and in which the operator can control release from positions remote from the gate.

Another important object of the invention is to provide an animal actuated head gate of the character described which is capable of handling animals of different sizes without requiring adjustment or change in the structure.

A further object of the invention is to provide an automatic head gate of the character described which effectively locks the animal therein and which is so constructed as to be proof against accidental release by head throwing or any other escape effort on the part of the animal.

Still another object of the invention is to provide an automatic head gate of the character described which is extremely light in weight, which can be easily installed in almost any type of alley or chute, either temporarily or permanently, or on any pair of posts defining a passageway therebetween, which is positive in operation, which has means for controlling and limiting the opening of the gate to the proper spacing, and which provides for easy, rapid and efficient handling of livestock.

Other and further objects of the invention together with the features of novelty appurtenant thereto will appear in the course of the following description.

In the accompanying drawings, which form a part of the specification and are to be read in conjunction therewith, and in which like reference numerals indicate like parts in the various views.

Figures 1, 2:
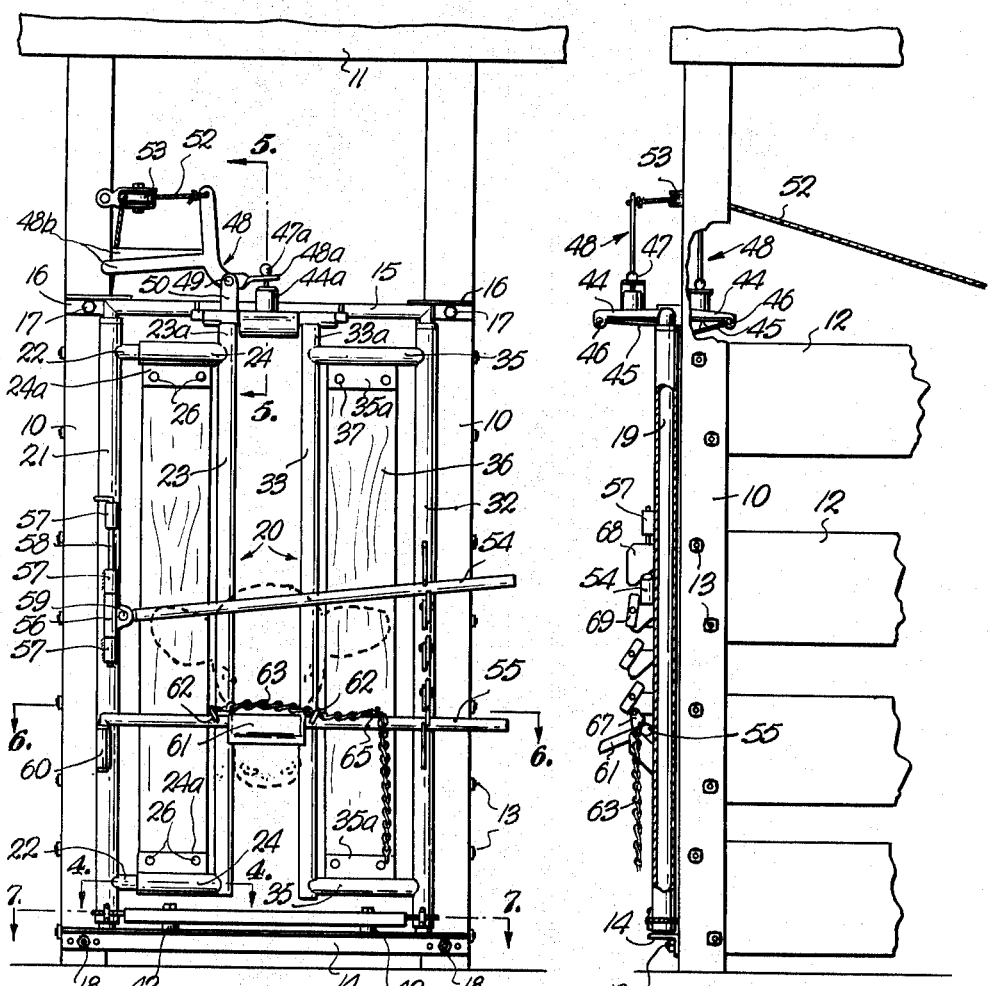
FIG. 1 is a front elevational view of a preferred head gate assembly embodying the invention, the gate being shown in the closed position with the head securing bars in head securing position and the front latch in the release position therefor.
FIG. 2 is a view taken from the right hand side of FIG. 1 but showing in this instance the front and rear latches both in the lowered gate locking position.

Referring to the drawings, reference numeral 10 indicates a pair of spaced parallel upright posts or columns forming the outlet end of a typical chute or alley through which cattle or other livestock may be driven. The posts are illustrated as being rectangular wooden posts which are joined at their upper end by a cross piece 11. Spaced horizontal side rails 12, which form the side walls of the alley or chute, are bolted as at 13 to the respective posts. The posts are anchored at their lower ends in any conventional manner, such as being imbedded in the ground or in concrete. The structural parts of the chute as thus far described are not a part of the instant invention except to the extent that they define the opening in which the head gate is installed and provide the necessary support therefor and consequently no further description is necessary. As will become more clear as the description proceeds, the invention gate assembly can be used with any type of conventional supporting members.

The head gate assembly of the preferred embodiment of the invention comprises a lower stationary bridge member 14 and upper stationary bridge member 15, each of which extends horizontally between the posts 10 and is rigidly secured thereto. The lower bridge member 14 is placed adjacent the ground while the upper bridge member 15 is located well up on the posts. Preferably the upper bridge member is constructed of cylindrical tubing. The lower bridge member is a length of angle section. The upper bridge member 15 is secured to the posts 10 by mounting brackets 16, each of which comprises an angle member welded or otherwise secured to the end portion of the bridge member and projecting lengthwise therefrom. The vertical leg of each bracket member is firmly secured to adjacent posts 10 as by bolt 17. The lower bridge member is secured to the posts by bolts 18.

Figure 10:
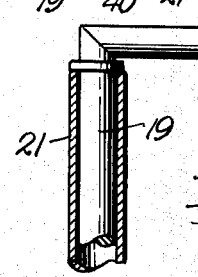
FIG. 10 is an enlarged detailed view illustrating the manner of hingedly mounting the upright swinging members on the gate bridge members.

Extending between the bridge members are the spaced upright tubular members 19 (FIGS. 2 and 10) from which are supported the swinging gate sections 20 and 20' which cooperate to form a double or bat wing gate assembly. The upper ends of members 19 are welded to the corresponding ends of the upper bridge member 15. The lower ends of members 19 are welded to the top flange of the lower bridge member 14.

The gate section 20, which is the gate on the left as viewed in FIG. 1, comprises an elongate upright tubular member 21 extending between the upper and lower bridge members on the left side of the chute. The inside diameter of member 21 is such that it rotatably fits on the upright member 19 so as to be swingable about a vertical axis coinciding with its longitudinal axis. Mounted on the member 21 by means of two laterally extending vertically spaced elements 22 secured thereto is the gate forming assembly comprising the upright member 23 having sleeves 24 extending laterally therefrom and telescopically fitting over the elements 22, as better seen in FIG. 4. A gate plank or board 25 extends between the sleeves 24 and is secured thereto by means of brackets 24a welded to the respective sleeves and bolts 26 extending through the brackets and plank.

Again referring to FIG. 4, which shows the internal construction of both the upper and lower telescopic connections, the outer member 23 of the gate is yieldably maintained at a selected spacing from the member 21 by means of a compression spring 27 contained within elements 22 and 24. The spring encircles a rod 28 which is welded or otherwise firmly secured at its outer end to a partition 29 rigidly affixed within the sleeve 24. A similar partition 30 is provided within the element 22. The rod 28 extends slidably through an appropriate aperture in the center of partition 30 and a head 31 on the rod limits the outward movement of sleeve 24 on element 22. The ends of the spring bear respectively against partitions 30 and 29.

The opposed gate section 20 is constructed similar to section 19 except that it does not include the spring loaded interconnection between the hinge member 32 and edge forming member 33 thereof. As in the case of the other section, the hinge member 32 is journaled on an upright member 19 between the lower and upper bridge members. The edge forming member 33 is joined to hinge member 32 by the upper and lower cross members 35 which are welded at their ends thereto. Brackets 35a similar to those at 24a on the other gate section provide mountings for the opposite ends of a plank or board 36, being joined thereto by bolts 37.

Figure 6:
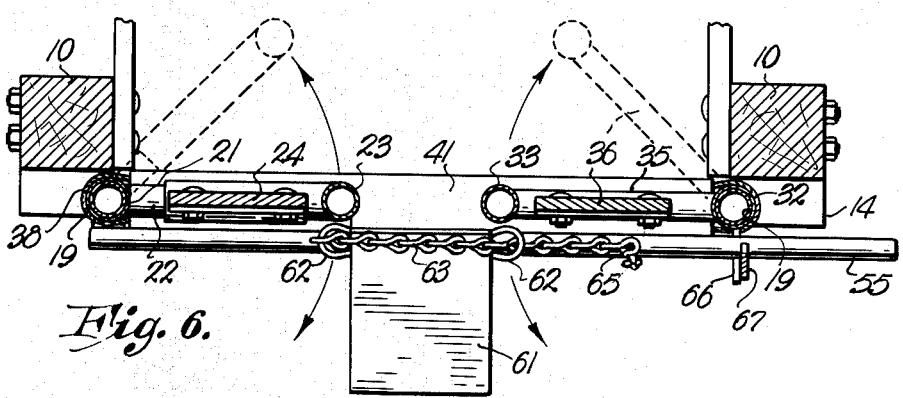
FIG. 6 is an enlarged sectional view taken along line 6—6 of FIG. 1 in the direction of the arrows.
Figure 7:
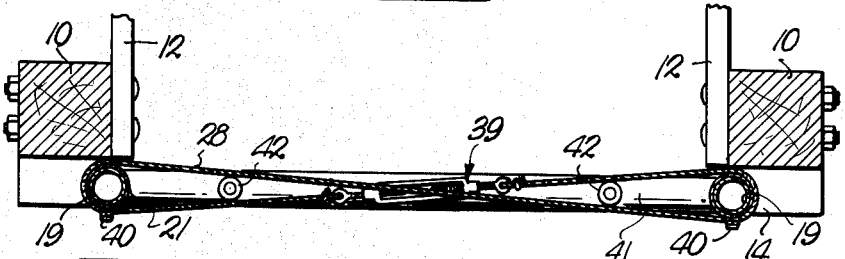
FIG. 7 is an enlarged sectional view taken along line 7—7 of FIG. 1 in the direction of the arrows.

The gate sections 20 and 20' are connected together to swing in synchronized fashion in either direction from the central, essentially coplanar position by means of the flexible wire or cable interconnection, this seen in FIG. 7. An endless cable 38 passes around the respective hinge members 21, 32, the cable being crossed over between the two. The cable has interposed therein a turnbuckle assembly 39 so that the tension in the cable can be adjusted as necessary. A portion of the cable looped around each hinge member is firmly and rigidly clamped thereto by a clamp 40. The clamps are so located that after the left hand gate turns approximately 45° counterclockwise and the right hand gate 45° clockwise (as viewed in FIGS. 6 and 7) no further movement in said direction is possible. However, it will be apparent that the gates can turn a full 90° in the opposite direction, that is in the direction away from the chute. The stopping point on the inswing, that is back into the chute or alley, is limited to less than 90°, preferably to an angle of about 45° with respect to the plane of the opening. The reason for this will be explained at a later point herein.

The cable is protected by means of an inverted channel member 41 extending across and above the lower bridge member 14 and containing between its side flanges the stretches of the cable extending between the hinge members. The protective channel is supported on spacers 42 secured to and extending upwardly from the lower bridge member. The upper ends of the spacers carry bolts extending upwardly through appropriate apertures in the protective channel and nuts 43 serve to secure the channel thereon.

Figure 5:
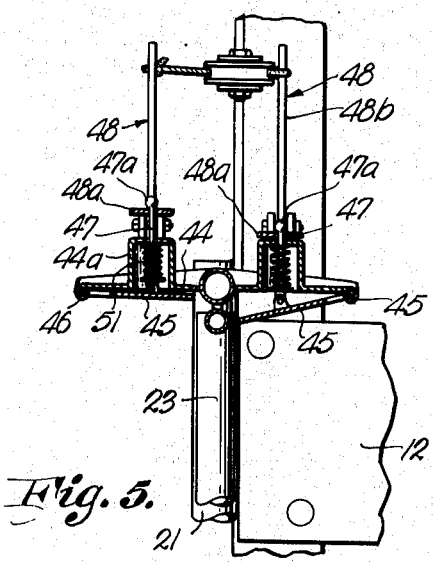
FIG. 5 is an enlarged fragmentary sectional view taken along line 5—5 of FIG. 1 in the direction of the arrows.

The automatic latch mechanism for the gate is located centrally on and is supported by the upper bridge member 15. As best seen in FIGS. 1 and 5, the upper ends of the gate edge members 23 and 33, respectively, project above the sleeves 24, 35, and provide upwardly projecting portions 23a and 33a, respectively. These upwardly projecting portions cooperate with the catch or latch elements now to be described.

Figures 3, 4:
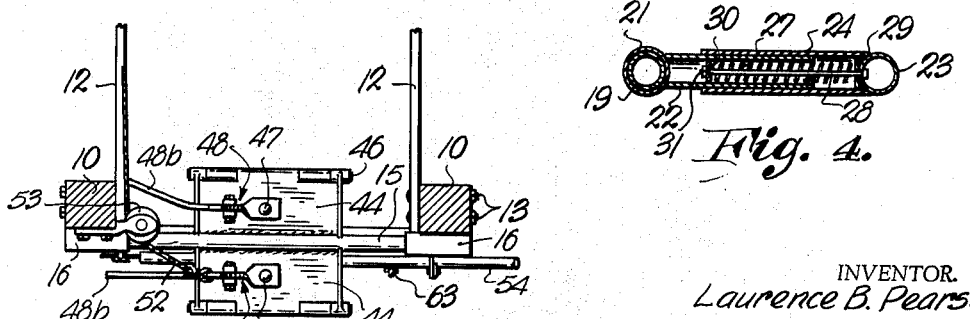
FIG. 3 is a sectional view taken along line 3—3 of FIG. 1 in the direction of the arrows.
FIG. 4 is an enlarged sectional view taken along line 4—4 of FIG. 1 in the direction of the arrows.

Referring particularly to FIGS. 1, 2, 3, and 5, extending forwardly and rearwardly from the sides of the upper bridge member 15 at the center thereof are identical platform members 44. Each of these members has hinged to its outer edge and disposed therebelow a pivotal catch or latch member 45. The pivotal connection can be much like the ordinary hinge as shown in FIG. 3, the pin 46 extending through interfitting hinge barrels formed respectively on the platform and catch member.

In their lowermost positions, the catch members 45 have their confronting edges spaced sufficiently as to permit the location therebetween of the upwardly projecting portions 23a, 33a of the gate members. In such position, the gate members are prevented from moving in either direction. The latch members are supported in the latching position just described by means of rods 47 which respectively extend up through housings 44a formed on the platforms 44. The rods are pivotally connected with the catch members at the lower ends of the rod. The upper ends extend through appropriate apertures in the housing. The upper ends of the rods are provided with head portions 47a.

To operate the rods 47 to selectively raise the latch members 45 and thus disengage them from the gate sections, there are provided the bell cranks 48, one for each rod. Each bell crank is pivotally mounted by a pin 49 to an upstanding bracket 50 secured to and supported on the top of the platform 44. The bell crank is twisted at that end adjacent the rod to provide the flat horizontal portion 48a which is apertured to receive therethrough the operating rod 47. The head 47a on the operating rod lies on top of the section 48a of the bell crank. Thus pivoting of the bell crank to raise section 48a causes a concurrent upward displacement of rod 47 and upward pivoting of the latch member 45 pivoted thereto. The latch members 45 are always urged into their downward position, which is the position illustrated on the right hand side of FIG. 5, with the latch member edge in the path of movement of the gate section and the portion 48a of the bell crank flat on top of the housing 44a by means of the compression spring 51. As earlier explained, in the normal condition for the gate, which when the gate sections are in the center or gate closing position, both latch members 45 will be in the lower position, thus immobilizing the gate therebetween. However, for purposes of illustration, we have shown the left hand latch member 45 in its upper or raised position so that the gate sections are free to swing forwardly.

Raising of a latch member 45 can be accomplished by grasping and pulling down on the extension 48b of the bell cranks, or by exerting tension on the rope 52. This rope can lead to any desired location. It is properly oriented with respect to the bell crank by a pulley 53 secured to the post. Only one pulley and rope have been shown, these being associated with the front latch member. Obviously a similar arrangement can be included for the bell crank connected with the rear latch member.

In order to locate and hold the head of an animal in a fixed vertical position, I have provided the upper and lower holding bars 54 and 55, respectively. Each of these bars is mounted to the gate member 21 for the left hand gate. The upper bar 54 has as its anchoring the sleeve 56 which is adapted to be interfitted between the vertically aligned hinge barrels 57 secured to the gate member 21. The sleeves can be fitted between the upper two or lower two of the hinge barrels and held therein by means of a movable L-shaped drop pin 58. The bar 54 is pivotally connected to the sleeve by pin 59 secured to a bracket on the sleeve 56.

The lower bar 55 is an L-shaped bar having a short vertical leg which is received in a sleeve 60 also affixed to gate member 21. The bar is thus swingable only in a horizontal plane. At its midpoint it includes the animal jaw rest 61 which extends forwardly and downwardly from the bar. On either side of the jaw rest are provided eyes 62. One end of a chain 63 can be secured to the left hand eye (as viewed in FIG. 1) and passed through the right hand eye for drawing about the nose of an animal. The remaining length of chain can be dropped into the slot of a U-shaped bracket 65 on the arm when the chain is pulled taut. The use of the chain and slotted bracket permits quick and easy clamping of the nose and chin between the chain and jaw-rest.

Figures 8, 9:
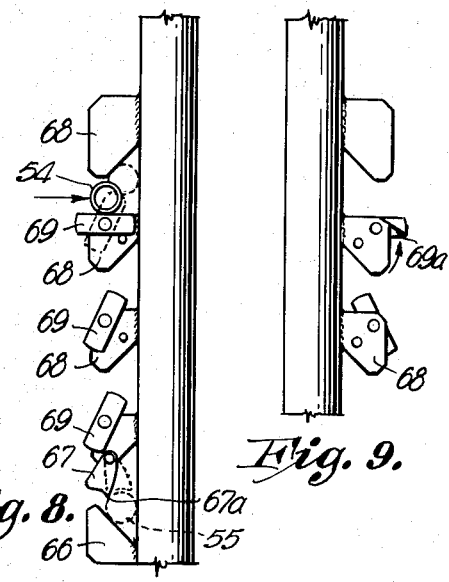
FIG. 8 is a fragmentary enlarged side elevational view of the vertical gate member carrying the head securing bar latch members, being taken from the same side as FIG. 2 and illustrating in greater detail the construction and operation of the said latch members.
FIG. 9 is a fragmentary view of said member shown in FIG. 8 but taken from the opposite side thereof.

The lower bar 55 is movable into and out of engagement with a latch arrangement which is shown in FIGS. 2 and 8. As seen best in FIG. 8 the latch includes a bracket 66 having an outwardly spaced, upturned lip defining a notch. When the bar is swung into position in the bracket, it moves up and over the lip and seats in the notch. As the bar enters, it engages and swings forward a pivotal latch member 67. This member has a tip portion 67a which prevents it being retracted back in the direction from whence it came while the bar is still in position. However, by manually swinging the latch member even further counterclockwise from its latching position, (as viewed in FIG. 8) the bar can be freed for withdrawal after which the latch will be returned by gravity to its normal position.

The upper bar 54 can be latched in a number of differing cross holding positions by means of the latch structure shown in FIGS. 8 and 9. I provide three brackets 68 having downwardly hooked lips, behind which the bar can be located as it is being brought into crosswise position. For each bracket 68 there is a cooperating gravity latch member 69 in the form of a bar pivoted to the bracket therebelow. As can be seen in FIG. 9 these bars are provided with weighted ends which serve two functions; first, always to move the bars in response to gravity forces into the positions illustrated in the broken lines at the upper part of FIG. 8 and solid lines therebelow and secondly, to provide a shoulder 69a which limits the gravity movement to the position illustrated. Obviously, the bar can be moved into position behind the lip of any of these brackets and in doing so will swing the upper end of the associated gravity latch 69 out of the way. Once the bar is moved into the upper portion of the notch, which it normally will do under the influence of upward pressure by an animal, gravity will cause the latching member to pivot about its axis and cooperate with the notch to hold the bar in position. To release the bar it is necessary only to apply an upward force on the outer end of the latch as illustrated by the arrow in FIG. 9, which results in sufficient displacement of the latch to permit the bar to be drawn back out of engagement in the notch.

In the operation of the invention the gates are initially set in the broken line position of FIG. 6 which is, as earlier indicated, with their inner edges within the alley. As an animal advances along the alley toward the gate its shoulders will engage either or both of the edge members 23, 33 of the gate sections, thus causing them to swing forward and progressively pinch the animal's neck therebetween. As the animal continues to advance and as the gates swing toward the center position they will engage the rearward gate latch member 45 and force it upwardly against the action of the biasing spring 49 until the portions 23a, 33a of the gates clear the edge of the latch member. As the edge of the latch member is cleared the spring will return the latch member to its downward position.

It will be understood, of course, that the forward latch member 45 will be in its normal downward position rather than in the raised position of FIG. 5. Accordingly, once the gate sections reach the center position they are prevented from movement on through by the forward latch member. The rearward latch member having fallen in behind the gates, the gate sections are now firmly retained in the center position with the neck of the animal squeezed therebetween. This prevents withdrawal of the head. The telescopic and bias connection for the outer member 23 of the gate 20 allows for variation in neck thicknesses and member 23 will give inwardly in the event the neck of an animal is of greater thickness than the spacing normally provided between the gates.

The next step in the operation is to bring the lower bar 55 from one side across and under the head of the animal and then upwardly so that the jaw rest 61 comes under the jaw of the animal. The bar is locked into position in the manner earlier described. The nose chain 63 should at this time be loose and sufficiently enlarged that slipping it over the nose of the animal will be no problem. The upper bar 54 is then brought in from above and downwardly on the upper portion of the neck. The bar can be used to force the head of the animal down until the jaw is firmly engaged with the jaw rest, at which time the upper bar is slipped into its appropriate latching notch as earlier described. Once the two bars are in position, the nose loop can be slipped over the nose and drawn down tight by means of the chain 64. The animal now is effectively immobilized for performance of any of the operations which may be deemed necessary.

To release the animal the nose loop and cross bars are disengaged, the cross bars being taken out of their locking notches as earlier described. They are swung to one side. The gate sections 20, 20' now form the sole restraint for the animal.

As will be evident, the gate sections can be released so that the animal can move on forwardly out of the chute, or alternatively rearwardly in the chute. If it is desired to pass the animal on through and out of the chute, the forward bell crank 48 is pivoted in order to raise the forward latch member 45. This can be done manually adjacent the gate by pulling down on the hand lever 48b or by means of the rope and pulley arrangement earlier described. The rope 52 can be run to any location, either forwardly or rearwardly, and so long as it is passed around the pulley and applies the pull in the correct direction, will serve to raise latch member 45. With the front latch member 45 raised, the gate sections are now free to swing forwardly and the animal opens the gate itself by proceeding forwardly. The animal cannot withdraw as the rear catch member 45 is still in position.

If it is desired that the animal not leave the chute or alley but return from whence it came, the rear bell crank member 48 is manipulated instead of the forward one. This pulls up the rear catch member, thus freeing the gates for return to the broken line position of FIG. 6, which spaces the gates sufficiently apart to permit withdrawal of the head of the animal. It will be apparent, however, that by reason of being limited in their movement to the FIG. 6 position, the gates effectively prevent the animal from going on forwardly through the chute. Should the animal try to do so, he will be successful only in latching himself again into the head gate.

Thus it will be seen that I have provided a gate which can be installed at almost any type of chute, alley or post mounting, and which, moreover, permits effective handling of livestock by only one man. The animal himself provides the energy necessary for opening and closing of the gate while control of the gate can be made by the man while at remote locations therefrom. Once the animal has locked himself in the operator can by manipulating the cross bars even more securely restrain him. The operating parts are such that attendance upon the animal at all times is not necessary, all parts being positively locked until it is desired that they be released.

From the foregoing description it will be seen that this invention is one well adapted to attain all of the ends and objects hereinabove set forth together with other advantages which are obvious and which are inherent in the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In an automatically actuated livestock headgate, the combination of
    a pair of laterally spaced upright members,
    a pair of gate sections, one for each member, each gate section mounted to its member for swinging movement about an upright axis, each gate having an animal neck engaging outer edge,
    means interconnecting said gate sections for synchronous movement in either direction toward and away from a central, substantially coplanar closed condition in which said outer edges can pinch between them the neck of an animal, and releasable latch means above said gate sections operable to engage and hold said gate sections in said closed condition, said latch means operable automatically to engage and hold said gate sections in said closed condition responsive to movement of the gate sections into the closed condition from either direction.

2. The combination as in claim 1 wherein the outer edge of at least one of said gate sections is formed by a member movable inwardly toward the post upon which it is mounted, and including resilient means biasing said last named member against inward movement.

3. The combination as in claim 1 wherein each gate section includes at its upper end adjacent the outer edge thereof an upstanding projection, and including a bridge member extending between said upright members above the gate sections, said latch means mounted on said bridge member and engageable with said projection.

4. The combination as in claim 3 wherein said latch means comprises opposed pivotal latch members having free edge portions which respectively normally lie on opposite sides of said projection once said gate sections are in said closed condition, and means for selectively pivoting said latch members upwardly and raising said edge portions out of the way of said projections.

5. The combination as in claim 4 wherein said latch members are provided with inclined surfaces positioned to be engaged by said projections during closing of the gate sections until the projections clear said free edge portions, said latch members arranged to automatically descend to said normal position as said projections clear said free edge portions.

6. The combination as in claim 1 including means operable to limit the outward swing of said gate sections from the closed condition in one direction to an angular displacement of less than 90°.

7. In an automatically actuated livestock headgate, the combination of a pair of laterally spaced upright members, a pair of gate sections, one for each upright member, each gate section mounted to its post for swinging movement about the longitudinal axis of the upright member, a cross member extending between and bridging said upright members above said gate sections, a central frame secured to said cross member and projecting laterally on opposite sides thereof, a pair of hinged latch members hingedly connected with the projecting ends of said frame and extending inwardly beneath the frame toward the common plane of the posts and terminating in confronting inner edges which are spaced from one another, each gate section having a latch engaging portion which, when the gate sections are substantially coplanar, lies between said confronting edges, latch operating means operable to selectively raise said latch members, and means interconnecting said gate sections for synchronous movement to either side of the coplanar position.

8. The combination as in claim 7 including a pair of vertically spaced cross bars each hinged at one common end to one of said gate sections, and releasable locking means for each bar on the other gate section.

9. The combination as in claim 8 wherein said locking means include mechanism operable to lock one cross bar at a plurality of elevations relative to the other.

References Cited by the Examiner
UNITED STATES PATENTS

| | | | |
|---|---|---|---|
| 2,566,013 | 8/1951 | Abernathy | 119—103 |
| 2,969,770 | 1/1961 | Collins | 119—98 |

SAMUEL KOREN, *Primary Examiner.*

HUGH R. CHAMBLEE, *Examiner.*